(12) United States Patent
McTaggart et al.

(10) Patent No.: US 6,523,671 B2
(45) Date of Patent: Feb. 25, 2003

(54) CONVEYOR ESCAPEMENT

(75) Inventors: Michael Douglas McTaggart, Windsor (CA); Andrew Noestheden, Tecumseh (CA)

(73) Assignee: Valiant Corporation (CA)

( * ) Notice: Subject to any disclaimer, the term of this patent is extended or adjusted under 35 U.S.C. 154(b) by 133 days.

(21) Appl. No.: 09/730,303

(22) Filed: Dec. 5, 2000

(65) Prior Publication Data

US 2002/0066635 A1 Jun. 6, 2002

(51) Int. Cl.[7] .............................................. B65G 21/20
(52) U.S. Cl. ................ 198/459.6; 198/345.1; 198/463.4
(58) Field of Search ..................... 198/345.1, 345.3, 198/459.6, 463.4

(56) References Cited

U.S. PATENT DOCUMENTS

| | | | | |
|---|---|---|---|---|
| 4,289,229 A | * | 9/1981 | Keller ......................... | 198/633 |
| 4,596,326 A | * | 6/1986 | Yautz, Jr. ................. | 198/463.6 |
| 4,998,614 A | * | 3/1991 | Riemenschneider et al. ..... | 198/463.4 |
| 5,168,976 A | * | 12/1992 | Kettelson ................. | 198/345.3 |
| 5,676,235 A | * | 10/1997 | Sam et al. ................ | 198/345.3 |
| 5,860,505 A | | 1/1999 | Metzger ................... | 198/463.4 |
| 6,112,877 A | * | 9/2000 | Herrick, IV .............. | 198/345.3 |
| 6,164,430 A | * | 12/2000 | Nishimura ............... | 198/345.1 |
| 6,193,047 B1 | * | 2/2001 | Brumm et al. ........... | 198/345.1 |

* cited by examiner

*Primary Examiner*—Douglas Hess
(74) *Attorney, Agent, or Firm*—Gifford, Krass, Groh, Sprinkle, Anderson & Citkowski, P.C.

(57) ABSTRACT

An escapement is provided for use in conjunction with a conveyor having a frame which defines a plane on which articles are conveyed along a predetermined direction of movement. The escapement includes a housing which is pivotally secured to the conveyor frame about a first axis which is perpendicular to the predetermined direction of movement of articles on the conveyor. The housing includes a portion which is radially spaced from the first axis while a resilient shock absorber is disposed between the housing portion and the conveyor frame. A stop bar is movably mounted to the housing between an engage and a release position. In the engage position, one end of the stop bar is positioned above the conveyor plane so that, with the stop bar in the engage position, the stop bar prevents the passage of articles on the conveyor past the stop bar. Conversely, in its release position, the stop bar is retracted below the conveyor plane thus releasing articles for further movement on the conveyor past the stop bar.

4 Claims, 2 Drawing Sheets

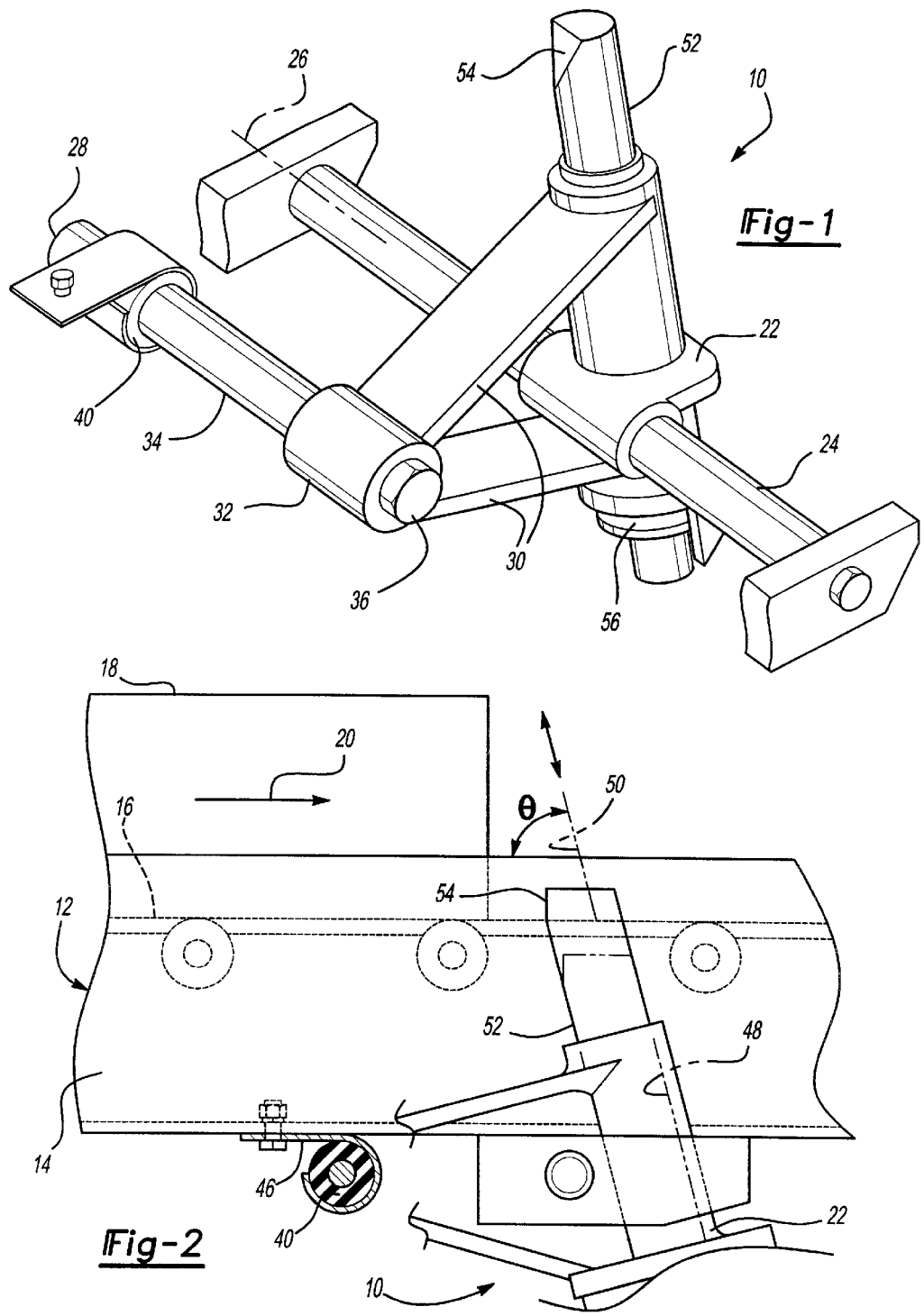

CONVEYOR ESCAPEMENT

BACKGROUND OF THE INVENTION

I. Field of the Invention

The present invention relates to an escapement for a conveyor.

II. Description of the Prior Art

There are many types of previously known conveyors, such as roller conveyors, in which articles may accumulate on the conveyor. These previously known conveyors typically comprise a frame defining a plane on which the articles to be conveyed are supported. These articles, furthermore, move in a predetermined direction of movement along the conveyor frame.

In many situations, it is desired to release articles for travel on the conveyor past a certain point only at predetermined intervals or when a predetermined event has occurred. In order to achieve this, there have been a number of previously known escapements which selectively prevent further travel of articles on the conveyor past the escapement.

These previously known escapements typically comprise a pin which is mounted to the conveyor frame and vertically movable between an engage position and a release position. In the engage position, a portion of the pin protrudes vertically upwardly above the conveyor plane so that articles conveyed by the conveyor abut against the stop pin. The articles are then held stationary on the conveyor by the stop pin until the stop pin is moved to its release position. In its release position, the pin is retracted below the conveyor plane on which the articles are conveyed thus releasing the article for further travel along the conveyor.

There have, however, been a number of previously known disadvantages with respect to these previously known escapements. One disadvantage of these previously known escapements is that, assuming that the escapement is in its engage position, articles traveling on the conveyor system strike the stop pin. In many cases, however, not only is the velocity of the article on the conveyor relatively high, but the articles themselves are relatively heavy. Consequently, these previously known escapements were subject to early failure and required excessive maintenance in view of the repeated impacts of the articles conveyed by the conveyor against the stop pin.

A still further disadvantage of these previously known stop pins is that the stop pins were movable in a vertical direction. Consequently, assuming that the stop pin is in its engage position and that an article is positioned against the stop pin, in order to move the stop pin to its release position, it has been previously necessary to overcome the friction between the stop pin and the article as the stop pin is moved to its lower or release position. In some cases, particularly with heavy articles, the actuator utilized to move the stop pin between its engage and release position was insufficient to overcome the friction between the stop pin and the article thereby causing a jam up on the conveyor line. The friction between the stop pin and the article also resulted in excessive wear on the stop pin due to the rubbing between the stop pin and the article as the stop pin is moved between its engage and release position.

SUMMARY OF THE PRESENT INVENTION

The present invention provides an escapement for a conveyor which overcomes all of the above-mentioned disadvantages of the previously known devices.

In brief, the escapement of the present invention comprises a housing which is pivotally mounted to the conveyor frame and beneath the plane on which the articles are conveyed by the conveyor. Furthermore, this pivotal axis of the housing is perpendicular to the direction of movement of articles on the conveyor plane.

The housing includes a portion which is radially spaced from the axis of rotation of the escapement housing. A shock absorber constructed of a resilient material is then positioned in between the radially spaced housing portion and the conveyor frame.

A stop bar is then longitudinally slidably mounted to the housing and movable by a conventional actuator between a raised or engage position and a lowered or release position. In its raised or engage position, a portion of the stop bar protrudes above the conveyor plane thereby engaging and stopping articles from further travel past the stop bar on the conveyor. Conversely, in its lower or release position, the stop bar is vertically retracted relative to the housing so that the entire stop bar is positioned below the plane on which the articles on the conveyor are conveyed thereby releasing the articles for further travel on the conveyor past the stop bar.

In practice and assuming that the stop bar is in its engage position, an article conveyed by the conveyor impacts against the end of the stop bar. This, in turn, causes the housing to pivot slightly about its pivotal axis and compress the resilient shock absorber between the housing portion and the frame. By cushioning the impact of the article against the stop bar, the resilient shock absorber protects the escapement from the previously known impact forces of the prior art devices.

Additionally, the stop bar is movable along a preset longitudinal axis relative to the housing between its engage position and release position. This preset axis for the stop bar intersects the direction of movement of the articles on the conveyor in an acute angle. Thus, unlike the previously known escapements, upon retraction of the stop bar from its engage to its release position, the end of the stop bar engaging the conveyed article moves both downwardly and in the direction of movement of the articles on the conveyor line. In doing so, unlike the previously known escapements, frictional sliding engagement between the stop bar and the conveyed article is minimized if not altogether eliminated.

BRIEF DESCRIPTION OF THE DRAWINGS

A better understanding of the present invention will be had upon reference to the following detailed description, when read in conjunction with the accompanying drawing, wherein like reference characters refer to like parts throughout the several views, and in which:

FIG. 1 is a perspective view illustrating a preferred embodiment of the present invention;

FIG. 2 is a side view of the preferred embodiment of the present invention;

DETAILED DESCRIPTION OF A PREFERRED EMBODIMENT OF THE PRESENT INVENTION

Figure 3:
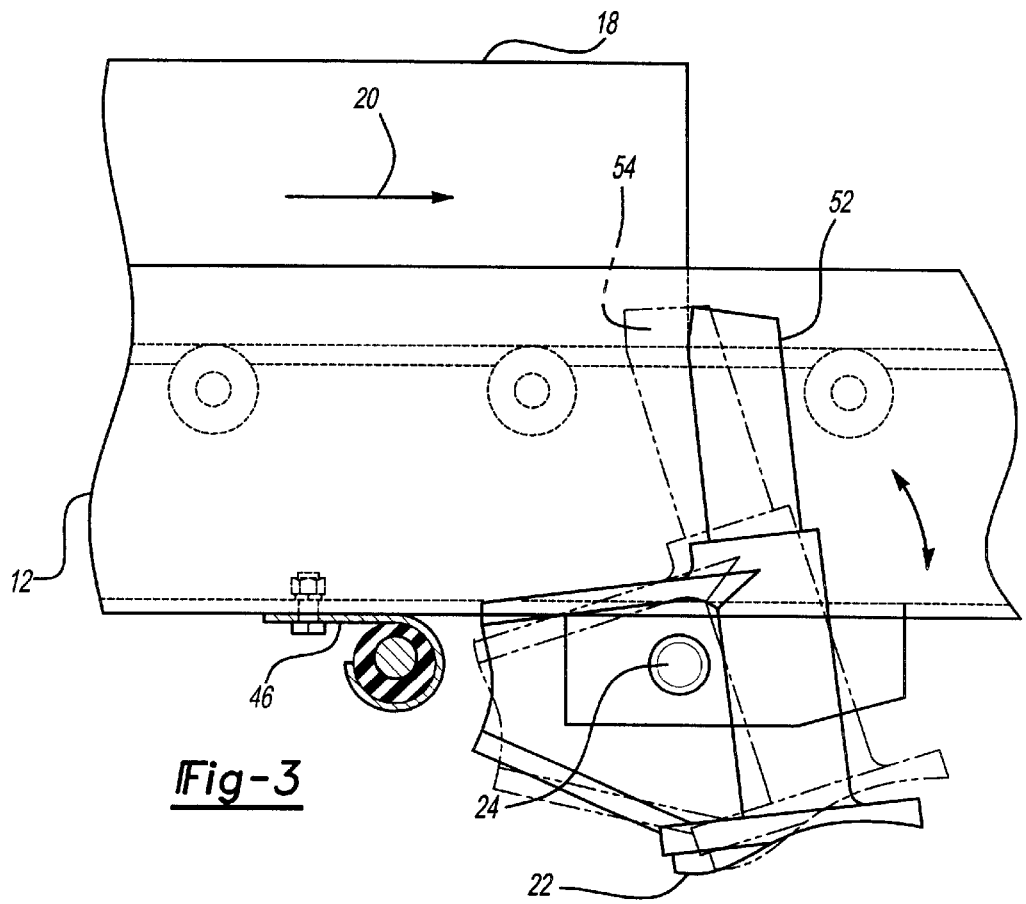
FIG. 3 is a view similar to FIG. 2, but illustrating the operation of the present invention.

With reference first to FIGS. 1 and 2, a preferred embodiment of the escapement 10 of the present invention is there shown for use with a conveyor 12. The conveyor 12 is illustrated in the drawing as an accumulating roller conveyor and, as such, includes a frame 14 defining a plane 16 on which articles 18 conveyed by the conveyor 12 are supported. Furthermore, these articles 18 move in a predetermined direction of movement 20 on the conveyor frame.

Still referring to FIGS. 1 and 2, the escapement 10 includes a housing 22 which is pivotally secured to the conveyor frame 14 by a shaft 24. The shaft 24, which is pivotally mounted to the conveyor frame 12 by any conventional fashion, is arranged so that the pivotal axis 26 (FIG. 1) of the housing 22 is substantially perpendicular and transverse to the direction of movement 20 of the articles 18 conveyed by the conveyor 12.

Referring now particularly to FIG. 1, the housing 22 includes a portion 28 which is radially spaced from the pivotal axis 26 of the housing 22. Although this housing portion 28 may take any conventional form, as illustrated in the drawing, the housing 22 includes a pair of struts 30 which support a tubular and cylindrical boss 32 at a position parallel to but radially spaced from the pivotal axis 26 of the housing 22. A shaft 34 then has one end 36 secured to the boss 32 so that the shaft 34 is parallel to but spaced from the housing mounting shaft 24. The other end of the shaft 34 forms the radially spaced housing portion 28.

Referring again to FIGS. 1 and 2, a shock absorber 40 constructed of a resilient material is positioned between the radially spaced housing portion 28 and the conveyor frame 14. In the preferred embodiment of the invention, the shock absorber 40 is tubular and cylindrical in shape and disposed over the free end of the shaft 34. The shock absorber 40 is then secured to the housing frame 14 in any conventional way, such as by a clamp 46.

Still referring to FIGS. 1 and 2, the housing 22 includes a throughbore 48 which extends in a direction perpendicular to the pivotal axis 26 of the housing 22. Additionally, as best shown in FIG. 2, the axis 50 of the bore 48 forms an acute angle θ (FIG. 2) with respect to the direction of movement 20 of the conveyed articles 18.

An elongated stop bar 52 is longitudinally slidably mounted in the housing bore 48 and movable between a raised engage position, illustrated in solid line in FIG. 2, and a retracted release position, illustrated in phantom line in FIG. 2. In its engage position, a portion of the stop bar 52 is positioned above the plane 16 of the conveyor 12. Thus, in its engage position, a face 54 registers with the conveyed article 18 and prevents passage of the article 18 past the stop bar 52. Conversely, when the stop bar 52 is moved to its lower release position (phantom line in FIG. 2), the stop bar 52 is positioned below the conveyor plane 16 thus allowing the conveyed article 18 to move past the stop bar 52 and thus past the escapement 10.

Preferably, the stop bar face 54 is machined so that it flatly abuts against the conveyed article 18. However, as best shown in FIG. 2, as the stop bar 52 is moved from its engage and to its lower release position, the face 54 not only moves downwardly from the article 18, but also away from the article 18 in the direction of travel 20 of the article 18. This downward and forward motion of the stop bar 52 thus minimizes or altogether eliminates sliding friction between the stop bar 52 and the article 18 as the stop bar is moved from its engage to its release position. Any conventional means, such as an electric solenoid 56 (FIG. 1), can be used to move the stop bar 52 between its engage and its release position.

Figure 4:
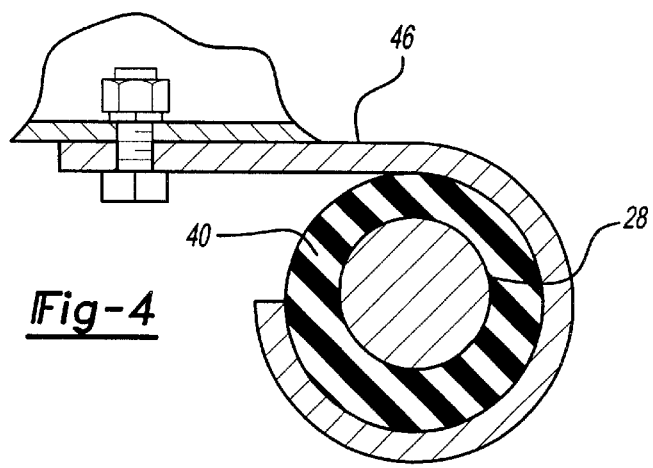
FIG. 4 is a fragmentary partial sectional view illustrating a portion of the preferred embodiment of the present invention.

With reference now to FIGS. 3 and 4, in FIG. 3 the stop bar 52 is illustrated in its raised engage position. Thus, as the article 18 traveling on the conveyor 12 impacts the face 54 of the stop bar 52, the impact force from the article 18 causes the stop bar 52 together with the housing 22 to pivot in a clockwise position from the position shown in phantom line and to the position shown in exaggeration in solid line in FIG. 3. Simultaneously, the pivotal movement of the housing 22 causes the free end of the shaft 34, i.e. the radially spaced housing portion 28, to pivot about the housing pivotal axis 26 thereby compressing the shock absorber 40 as shown in FIG. 4. In doing so, the compression of the shock absorber 40 effectively dampens the impact of the article 18 against the stop bar 52 thus protecting the escapement 10 from high impact forces.

It will, of course, be appreciated that different shock absorbers 40 of different durometers may be employed depending upon the expected force of impact from the articles 18 against the stop bar 52. For example, a relatively hard shock absorber having a high durometer would typically be used for a heavier article 18 while, conversely, a softer shock absorber having a lower durometer would be used for articles of lighter weight.

From the foregoing, it can be seen that the present invention provides a simple and yet highly effective escapement for use with a conveyor system, such as a roller conveyor system. Having described my invention, however, many modifications thereto will become apparent to those skilled in the art to which it pertains without deviation from the spirit of the invention as defined by the scope of the appended claims.

We claim:

1. For use in conjunction with a conveyor having a frame which defines a plane on which articles are conveyed along a predetermined direction of movement, an escapement comprising:

a housing, means for pivotally securing said housing to the conveyor frame about a first axis, said first axis being substantially perpendicular to said predetermined direction of movement, said housing having a portion radially spaced from said first axis, a stop bar, means for movably mounting said stop bar between an engage position in which a portion of said stop bar is positioned above said conveyor plane, and a release position in which said stop bar is positioned entirely below said conveyor plane, a resilient shock absorber disposed between said housing portion and the conveyor frame, wherein said housing includes at least one strut extending radially outwardly from said first axis and an elongated shaft, said at least one strut secured at its end most spaced from said first axis to one end of said shaft so that said shaft is parallel to and radially spaced from said first axis, said shock absorber being disposed around the other end of said shaft.

2. The invention as defined in claim 1 wherein said stop bar is elongated and wherein said movable mounting means comprises means for longitudinally slidably mounting said stop bar along a predetermined axis of movement to said housing.

3. The invention as defined in claim 2 wherein said predetermined axis of movement of said stop bar forms an acute angle with respect to the direction of movement of articles on said conveyor.

4. The invention as defined in claim 1 and comprising a flat formed on one end of said stop bar, said flat lying in a substantially vertical plane.

* * * * *